United States Patent
Niehoff

(10) Patent No.: US 8,163,062 B2
(45) Date of Patent: Apr. 24, 2012

(54) METHOD FOR OPERATING A HEARTH FURNACE

(75) Inventor: Thomas Niehoff, Markt Indersdorf (DE)

(73) Assignee: Linde Aktiengesellschaft (DE)

( * ) Notice: Subject to any disclaimer, the term of this patent is extended or adjusted under 35 U.S.C. 154(b) by 50 days.

(21) Appl. No.: 12/832,153

(22) Filed: Jul. 8, 2010

(65) Prior Publication Data

US 2011/0162485 A1    Jul. 7, 2011

(30) Foreign Application Priority Data

Jul. 21, 2009    (DE) .................. 10 2009 034 041
Sep. 17, 2009    (EP) ..................... 09011881

(51) Int. Cl.
*F23N 5/00*    (2006.01)
(52) U.S. Cl. .............................. 75/414; 431/2; 431/12
(58) Field of Classification Search .............. 75/414; 431/2, 12
See application file for complete search history.

(56) References Cited

U.S. PATENT DOCUMENTS

| | | | | |
|---|---|---|---|---|
| 4,644,173 A  * | 2/1987 | Jeffers ........................ | 250/554 |
| 6,331,107 B1 * | 12/2001 | Philippe ...................... | 431/285 |
| 2006/0199125 A1 | 9/2006 | Evans | |
| 2007/0254251 A1 * | 11/2007 | Cao et al. ....................... | 431/10 |

FOREIGN PATENT DOCUMENTS

EP    0 168 235 A    1/1986
WO    WO 2006/048003 A1    5/2006

OTHER PUBLICATIONS

Karl Brotzmann and Christian Gunther, New Applications of Hot Blast Jets in Metallurgical Processes, Jun. 16, 2003, pp. 67-72, Bd. 123, Nr. 6/07, Stahl und Eisen, Verlag Stahleisen, Dusseldorf, Germany.

* cited by examiner

*Primary Examiner* — George Wyszomierski
*Assistant Examiner* — Tima M McGuthry Banks
(74) *Attorney, Agent, or Firm* — Joshua L. Cohen

(57) ABSTRACT

A method for operating a hearth furnace encompassing a furnace chamber heated by at least one burner, including: a) introducing metal-containing material into the hearth furnace, b) melting the metal-containing material in a first melting phase until a melting bath surface has formed, c) melting the metal-containing material in a second melting phase after the melting bath surface has formed, d) removing and/or holding the melted metal, characterized in that the at least one burner is operated during the phase (b) such that a larger portion of burner capacity is emitted in convection rather than in radiant energy, and that respective portions of convection heat and of radiant heat emitted by the at least one burner are adjusted specifically via adjustment of brightness and/or size, in particular length of a flame of the at least one burner.

11 Claims, 1 Drawing Sheet

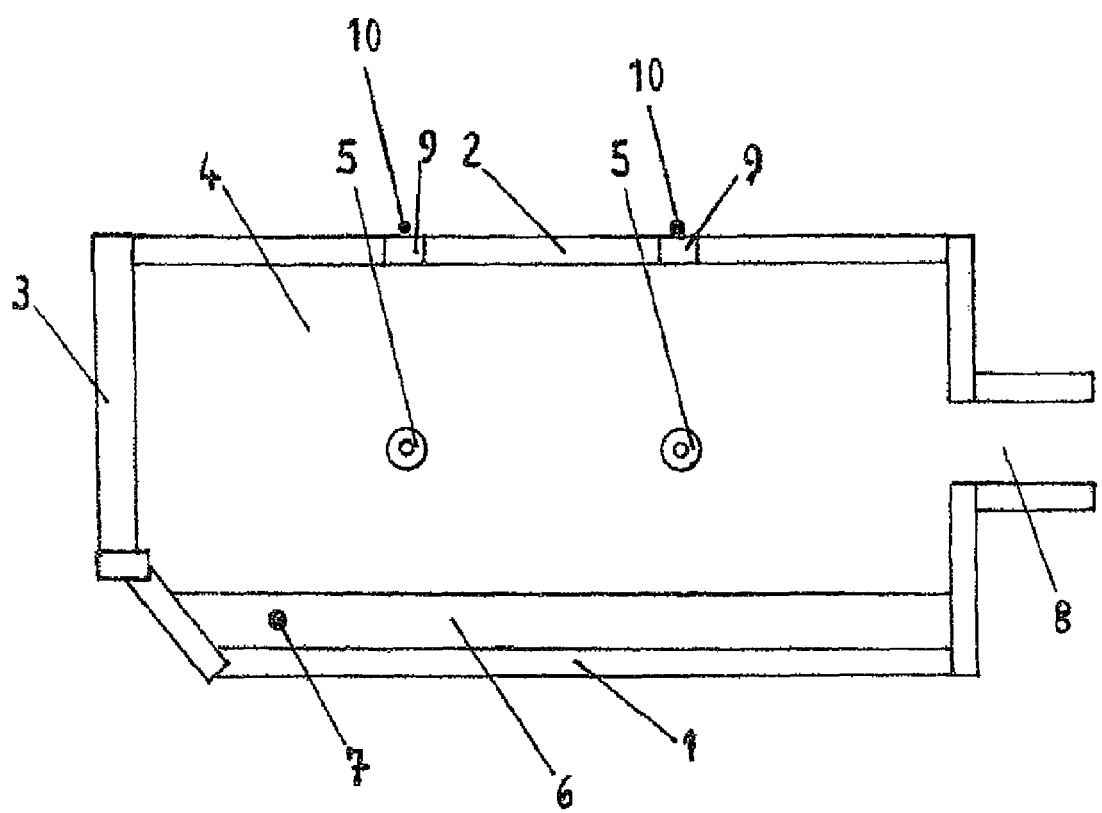

METHOD FOR OPERATING A HEARTH FURNACE

The instant invention relates to a method for operating a hearth furnace for melting a metal-containing material.

As is known, melting furnaces of different designs are used for melting metal, such as copper, aluminum, lead or iron, e.g. Hearth furnaces, drum melting furnaces and tower furnaces are used, e.g. As a rule, such furnaces are still operated in a highly original manner in that an assistant as the person in charge of the furnace monitors the melting process and takes control as soon as he considers such an action to be required. In practice, the result or also the efficiency with which such a melting furnace can be operated often vary considerably due to the fact that the process conditions and the starting materials vary to a high degree, e.g. with reference to the quality and origin of the metal waste to be melted, and due to the fact that different associates control the melting process in different manners.

There are attempts, in particular in the field of drum melting furnaces, to attain a comparatively evened-out operating method for the melting furnace, which varies little between the individual shifts of the persons in charge of the furnace, by using sensors for selected operating parameters, such as the temperature at certain locations in the interior of a melting furnace, e.g. A number of possibilities for this can be found from document US 2006/0199125 A1, for example for the operation of a drum melting furnace.

The instant invention is based on the object of providing a method for operating a hearth furnace, which is improved with reference to the control of the operation and the adaptability thereof to the respective melting object.

The posed object is solved by means of a method of the aforementioned type, wherein at least one of the burners is operated during the first melting phase (b) such that a larger portion of the burner capacity is emitted in the form of convection than in the form of radiant energy and the respective portions of convection heat and radiant heat emitted by the at least one burner, are adjusted specifically via the adjustment of the brightness and/or the size, in particular the length of the flame of the at least one burner.

In the case of a hearth furnace with direct loading, the material to be melted is introduced directly into the furnace chamber of the hearth furnace. The furnace chamber is defined by a furnace base, which is also referred to as hearth, and a furnace roof, which together surround the furnace chamber. In the first melting phase (b) after the loading, that is, after the introduction of the material to be melted, much solid, not yet melted metal is located in the furnace chamber in the case of a hearth furnace with direct loading.

A hearth furnace with indirect loading differs from a hearth furnace with direct loading by the presence of a loading chamber, which is arranged upstream of a furnace chamber. The material to be melted is initially introduced into the loading chamber and is melted. The liquid metal is pumped from the loading chamber into the furnace chamber, is homogenized there and is further over-heated. The first melting phase thus takes place in this loading chamber in response to indirect loading.

In the first melting phase after the loading, a large portion of the material to be melted, for example metal, lies "in the shadow" in both cases. This portion of the material can thus be barely heated by means of heat radiation. In this melting phase, at least one burner is to be operated according to the invention such that a larger portion of burner capacity is emitted in the form of convection rather than in the form on radiant energy. A large portion of convection heat means that a large quantity of hot gas is available, which can also permeate the area between the solid materials. The areas of material to be melted, which are not detected or only barely detected by the heat radiation caused by the flame of the burner, are thus also heated. Advantageously, the circulation of the gas in the furnace chamber takes place by means of the flow of the hot gas, which is particular to the convection.

According to the invention, the radiant capacity, that is, the portion of the burner capacity, which is emitted by the burner or the burners in the form of radiant energy, is at the same time to be lower than the portion of the convection in the first melting phase after the loading. This is particularly advantageous because, due to the lack of material circulation in the first melting phase, the same material, that is, the same metal parts, which have not yet been melted or which have only been melted partially, are always subjected to the heat radiation and that the material can thus overheat and burn in response to a high energy application via radiant heat. This is not desired, because valuable material would thereby be lost during the melting process.

It turned out that the flame characteristic is of particular importance in the case of a hearth furnace.

According to the invention, the adjustment of the portions of convection heat and radiant heat of the burner capacity emitted by the at least one burner is reached via the adjustment of the flame of the at least one burner, wherein it turned out that the adjustment of the brightness of the flame and/or of the size of the flame and thereby in particular the flame length determine the distribution of the above-mentioned portions to a crucial degree. A high brightness of the flame thus represents a large radiant portion and vice versa a low flame brightness represents a small portion of radiant energy of the total emitted thermal energy and a correspondingly larger portion of convection energy, which is emitted by the burner flame. It is thereby assumed herein that the sum from the convection heat and the radiant heat substantially corresponds to the emitted total thermal energy of the flame.

According to the invention, the flame characteristic, in particular the flame brightness and/or flame size are controlled by controlling the air portion and/or the oxygen portion of the gases, which are supplied to the burner. Depending on the desired flame characteristic and according to the desired heat transfer mechanism, the oxidant supplied to the burner or the burner thus has an oxygen content of between 21 vol. %, that is use of air, and 100 vol. %, that is use of pure oxygen. To attain a higher radiant capacity, an oxidant comprising a higher oxygen portion is thus supplied to the burner than to reach a large convective portion of burner capacity. For example, the burner or the burners is/are operated as air burners in the first melting phase, if need be with a slight oxygen enrichment of the air, while air, which is highly enriched with oxygen or technically pure oxygen, is used in the second melting phase as oxidant.

In the first melting phase, at least one burner is operated with an oxidant, which has a small oxygen portion, that is, air or air which is slightly enriched with oxygen, e.g. In this phase, the oxidant has an oxygen portion of less than 50 vol. %, less than 40 vol. %, less than 30 vol. % or less than 25 vol. %, for example.

In the second melting phase, at least one burner is operated with an oxidant, which has a relatively large oxygen portion, in any case an oxygen portion, which is larger than that of the oxidant in the first melting phase. In the second melting phase, air enriched with oxygen or pure oxygen is thus preferably used as oxidant. In this phase, the oxidant has an oxygen portion of more than 50 vol. %, more than 70 vol. %, more than 90 vol. %, more than 95 vol. % or even of 100 vol. %, for example.

In an embodiment of the invention, all operating burners in the first melting phase are adjusted such that a larger portion of burner capacity is emitted in the form of convection rather than in the form of radiant energy. In the second melting phase, all operating burners are correspondingly adjusted such that a larger portion of burner capacity is emitted in the form of radiant energy rather than in the form of convection. Preferably, the burner capacity transferred in the first melting phase to the material in the form of convection thus prevails, while in the second melting phase the material is heated more by radiant capacity than by convection.

In response to the transition from the first into the second melting phase, the burners or a portion of the burners can either be further operated with a larger oxygen portion, that is, the oxygen portion in the oxidant supplied to the burner is increased in response to the switch-over into the second melting phase, or the burners or a portion of the burners are switched off and other burners, which operate with a larger oxygen portion in the oxidant, are switched on.

It is thus the goal of the instant invention to optimize the melting process in a hearth furnace via the adjustment of the flame characteristic. The oxygen portion in the oxidant is controlled as a function of the flame characteristic such that the energy supplied by the burner is transferred to the material either mainly in the form of radiation or mainly in the form of convection. For example, the brightness of the flame of at least one burner is measured. Advantageously, a further operating parameter, such as the temperature of the melting bath, e.g., is measured and a certain brightness of the flames of the burner is adjusted, depending on whether the melting process is in the first (b) or in the second (c) melting phase.

The first melting phase is characterized in that a large portion of the material is still present in solid form in the furnace chamber. In essence, a circulation of the material thus does not take place. The onset of the second melting phase is characterized in that a liquid melting bath has already formed. Preferably, the transition from first to second melting phase is determined by the point in time, at which more than 80%, particularly preferably more than 90% of the total material located in the furnace chamber or in the loading chamber have been melted. In an exceptionally preferred manner, the phase, in which the entire material to be melted has transitioned into the liquid phase, is considered to be the onset of the second melting phase.

Preferably, the invention serves to melt material, which includes copper, aluminum, lead or iron. In particular, the method according to the invention is suitable for producing the mentioned metals from the base material, which is to be melted.

Advantageously, the furnace operator initially preselects certain values for putting fuel gas and oxidant through the burner, e.g. for a partially automated control. The brightness measurement then provides a confirmation of this first adjustment as being correct or displays the need for correction, which the furnace operator complies with by newly adjusting or adapting, respectively, the mentioned values. In so doing, the operation or the furnace operating mode, respectively, is controlled with the aid of the brightness of the flame of the burner.

According to the invention, provision can also be made for different target values of brightness for each of the flames for more than one burner, e.g. for two or three burners. This means that the furnace chamber is heated differently at different locations. For example, one area of the furnace chamber in which the material has already completely transitioned into the liquid phase, can be heated with a larger portion of radiant energy than an area of the furnace space, in which solid base material is not yet located.

One or a plurality of burners, which are operated with air as oxidant are preferred. A large portion of the emission of burner capacity can thus be adjusted in the form of convection heat. As already described, this is particularly important for the first melting phase (b). According to the invention, special air burners as well as burners, which can also be operated as air burners, can be used. The deciding feature of both possibilities is that the nitrogen contained in the air is not converted in response to the combustion with air as oxidant, thus remains as inert gas, but is heated in response to the combustion and is thus available as hot gas for the convection in a relatively large quantity.

According to a particularly advantageous embodiment of the invention, at least one of the burners is operated during the second melting phase (c) such that a larger portion of the burner capacity is emitted in the form of radiant energy than in the form of convection and that the respective portions of convection heat and of radiant heat, which are emitted by the at least one burner, are specifically adjusted via the adjustment of the brightness and/or size, in particular length of the flame of the at least one burner. The second melting phase (c) starts when a melting bath surface has formed.

The process in the second melting phase preferably differentiates between two embodiments of a hearth furnace, which are often encountered in practice: the hearth furnace with a device for circulating the melting bath and the hearth furnace without such a device. A different adjustment for the flame characteristic of the at least one burner is advantageous, depending on which of these two embodiments is available.

In the event that the used hearth furnace encompasses a device for circulating the melting bath, a large portion of radiant capacity of the capacity, which is emitted by the at least one burner according to the invention, is thus aimed at according to the invention. According to experience, a high radiant capacity of the burner corresponds to a very bright flame of the burner. According to the invention, the brightness of the flame is used to evaluate and adjust the radiant capacity of a flame. A high brightness thereby corresponds to a high radiant capacity, whereas a low brightness corresponds to a low radiant capacity. In addition, a large convention portion of burner capacity emitted by the burner corresponds to a low radiant capacity. Both portions can thus be measured and adjusted, e.g. via the brightness of the flame of the burner.

The operation of the respective burner by means of an oxidant, which encompass an oxygen portion, which is larger than that of air, represents a possibility for influencing the brightness of the flame in practice. The possibilities herein extend from a slightly increased oxygen portion to the use of a pure oxy-fuel burner, that is, a burner, which is operated with technically pure oxygen as oxidant. For example, the oxidant can have an oxygen portion, which is only slightly larger than air, for example 25 vol. % to 40 vol. % or also a very large oxygen portion of more than 90 vol. % up to 100 vol. % of oxygen.

However, the approach in the case of a hearth furnace without a device for circulating the melting bath is different: in the case of such an embodiment, it is advantageous to limit the radiant capacity of the at least one burner according to the invention such that an undesired combustion of melted metal does not take place on the surface of the melting bath. Such a combustion can take place when the heating of the metal bath was chosen to be too high, because, without circulation, the portion of the metal melt which located on the surface, which is permanently always the same, must accommodate the majority of the radiant capacity. In a particularly advantageous manner, a flame comprising a low brightness or also an invisible flame is used for a hearth furnace without a device for circulating the melting bath. The invisible flame is also referred to as flameless combustion. Special burners, which are specifically designed for the flameless combustion can be used for the flameless combustion and conventional burners can be operated without flame.

In all of the described cases, the burner capacity as it is known from the state of the art, is controlled or regulated in a particularly advantageous manner in addition to the brightness of the flame, or generally speaking, the flame characteristic.

The size of the flame and of the space assumed by the flame are a measure for how the heat of the combustion is distributed in the furnace chamber and in the material to be melted. Depending on the process step, certain furnace parts can be relatively hot or cold. For example, certain furnace parts are relatively cold immediately after the loading. Such temperature drops can be quickly compensated for in the furnace by regulating the flame volume, whereby the melting process is homogenized.

In a particularly advantageous manner, the flame is thus adjusted to be different for the first melting phase (b) and for the second melting phase (c) with reference to its brightness and/or size, in particular length and/or volume.

Advantageously, one or a plurality of burners, which are operated with an oxygen-containing gas, the oxygen content of which is larger than that of air, in particular with technically pure oxygen, are used. The advantages and applications of these approaches have already been described. In a particularly advantageous manner, one or a plurality of such burners are used during the second melting phase (c).

In the alternative or in addition to the use of air burners, a portion of the furnace gas is circulated to increase the convection in the furnace chamber. For this, furnace gases are sucked out of the furnace chamber and are fed to the furnace chamber again, whereby an increase of the convection is reached by these heated gas quantities, which flow due to the circulation.

Preferably, the brightness and/or size of the flame of one or a plurality of burners is in each case regulated as a function of the temperature in the melting bath.

Furthermore, there is a plurality of further parameters, e.g. the composition of the furnace atmosphere, which can be used advantageously for controlling or regulating the hearth furnace. In a particularly advantageous manner, the brightness of the flame, e.g., can thus be adjusted as a function of the composition of the furnace atmosphere, which was measured for this purpose by means of suitable means, or at least the portions of the main component of the furnace atmosphere can be determined. Further possibilities for particularly suitable parameters are explained in more detail in the examples, which follow below.

According to a particularly advantageous development of the invention, the brightness of the flame is measured via an ultraviolet (UV) probe. For this, provision can be made for one or a plurality of UV probes in the furnace chamber.

In the alternative, provision can be made in the loading door of the hearth furnace or in the furnace roof or in the furnace wall for a viewing window, through which there is a visible connection between a UV probe attached outside of the furnace chamber and the flame of the at least one burner, which is operated according to the invention and the brightness of the flame can thus be measured with the aid of the UV probe. According to the invention, provision can also be made for a plurality of viewing windows and for a plurality of UV probes.

As an alternative to the measurement of the brightness of the flame during the melting operation, as described above, it may be advantageous for certain applications to perform an empirical determination of the brightness of the flame in advance, thus prior to the onset of the melting process, so that certain flame temperatures and thus a brightness of the flame corresponding to the respective flame temperature can be assigned to certain operating parameters, such as the oxygen throughput through the burner, which is to be evaluated, or the fuel gas throughput corresponding to this burner. The correlation of the flame brightness or flame temperature, respectively, with these operating parameters can be used to determine the brightness of the flame by means of the currently available operating parameters. The throughput of oxidant and fuel can thus be determined, for example, instead of a direct measurement of the brightness of the flame and conclusions can be drawn from these variables to the flame brightness. The empirically determined context between operating parameter, e.g. oxygen and fuel gas throughput, thus allow for a conclusion to the relative and/or absolute portions of radiant and convection capacity of the burner.

An advantageous development of the invention provides for the use of an electronic data collection as well as for means for evaluating the collected data for collecting the operating parameters.

A further particularly preferred embodiment of the invention provides for the use of means for controlling and/or regulating and/or optimizing and/or operating the melting process fully automated, which access the electronically collected operating parameters as input variables.

Provision is thereby preferably made for means for detecting the brightness and/or the size, in particular the length of the flame of at least one of the burners; provision is particularly preferably made for a UV probe as means for this. Preferably, the determination of the size and/or length of the flame is performed via an optical control, for example by providing one or a plurality of suitable viewing windows in the loading door and/or the furnace roof and/or the furnace wall of the hearth furnace.

Provision is made in a particularly advantageous manner in a hearth furnace, e.g. air and oxygen burner (oxy-fuel burner) for burners of different types, wherein according to the invention the selection of which of the burners operate simultaneously makes it possible to adjust the portions of convection and radiant capacity in the furnace chamber and/or in the loading chamber and in the furnace chamber, as far as available, and to adapt them to the respective melting phase or to optimize them for the respective melting phase, respectively. For the optimization, provision is preferably made for an electronic data collection and processing.

As an alternative to the aforementioned embodiment, it is possible to use the same burner for different operating modes, thus to switch one or a plurality of burners, e.g., between an operation with air as oxidant and with technically pure or less pure oxygen or to operate the same burner as burner for a flameless combustion.

An important advantage of the instant invention is to be seen in attaining an even and evenly well melting result, which differs little between the individual shifts of the persons responsible for the furnace, such as for a hearth furnace.

The invention offers a large number of further advantages, only a few of which are mentioned below: the melting process can be optimized in a simple manner, e.g. with reference to the quality of the melting result, the costs and/or the productivity of the melting method. The transition from the first melting phase to the second melting phase as well as each of the two melting phases by themselves can further be optimized. Last but not least, the instant invention identifies possibilities for electronically controlling and automating the melting process. All of the required operating parameters can be detected via sensors, such as nano sensors, e.g.

Further operating parameters and approaches, which can advantageously be used for controlling or regulating the melting process, will be explained in the following Examples:

EXAMPLE 1

The temperature profile of the fire proof lining, which lines the furnace chamber, according to which the brightness and/or size of the flame of at least one burner is controlled, can be used as operating parameter. For this purpose, one or a plurality of temperature sensors are installed at the fire proof lining and the temperature is measured with them. Particularly advantageously, a temperature sensor e.g., is installed on the ceiling of the furnace roof.

EXAMPLE 2

According to another embodiment, the temperature and/or the composition of the exhaust gas can also be measured in the exhaust gas flow of the hearth furnace and can be used as operating parameter for controlling or regulating the flame characteristic. It can furthermore be advantageous to determine the pressure in the exhaust gas duct, through which the exhaust gas leaves the hearth furnace, by means of a device for pressure measurement and to use this value as operating parameter for controlling or regulating the melting process.

EXAMPLE 3

The position (open or closed) of the loading door of the hearth furnace can also used as operating parameter, e.g. detected via a sensor and can be used for controlling or regulating the melting process and in particular of the burner operation. The same applies to the progression of the loading process, which can also be detected and used as operating parameter in terms of the invention.

EXAMPLE 4

This is an example for a semi-automatic embodiment of the instant invention. The person operating the furnace thereby obtains information relating to a screen, which serves as output medium for an electronic data collection and processing and which determines a clear course of action for the person operating the furnace from suitable operating parameters. The person operating the furnace then takes control of the melting process according to the instructions.

All of the above-mentioned alternatives can be used individually as well as in combination with one another.

The invention as well as further embodiments of the invention will be defined in more detail below by means of the exemplary embodiment illustrated in the FIGURE which shows a schematic illustration of a hearth furnace comprising a temperature sensor in the area of the melting bath and two burners.

In detail, the FIGURE shows a hearth furnace for melting metal comprising a furnace base 1 and a furnace roof 2 as well as a loading door 3, via which the metal to be melted, e.g. metal waste, is introduced into the hearth furnace. The FIGURE shows a hearth furnace with direct loading.

As is shown in the FIGURE, a furnace chamber 4 is surrounded by the furnace base 1, the furnace roof 2 as well as by perpendicular side walls, which are also assigned to the furnace roof, and the loading door 3.

This exemplary embodiment shows two burners 5, which are used to heat the furnace chamber 4 in each case alone or together and to provide suitable conditions for melting the metal introduced into the furnace chamber 4. For this, the flame of at least one of the two burners 5 is controlled according to the invention as a function of one or a plurality of operating parameters. In this example, the temperature of the melting bath is measured as operating parameter with the aid of a temperature sensor 7.

The brightness of the flame of at least one of the two burners 5 is measured by means of a UV probe 10. Preferably, the brightnesses of the flames of both burners 5 are measured. The UV probes are installed on the exterior of a viewing window 9, which is in each case arranged in a substantially perpendicular manner above the respective burner 5 in the furnace roof 2.

In response to a certain temperature of the melting bath 6, a certain brightness of the flame of the two burners 5 is desired, depending on whether the melting process is in the first (b) or in the second melting phase (c). Two different target values of brightness can thereby also be available for each of the two flames. Certain values are preselected for the throughput of fuel gas and oxidant, e.g. for a semi-automatic control by the person operating the furnace for the respective burner 5. The measurement of the brightness then leads to a confirmation of this first adjustment as being correct or displays a need for correction, which the furnace operator complies with by newly adjusting or adapting, respectively, the mentioned values. In so doing, the operation or the furnace operating mode, respectively, is controlled with the aid of the brightness of the flame of a burner 5.

At least one of the burners 5 is to thereby be operated during the first melting phase (b) such that a larger portion of burner capacity is emitted in the form of convection than in the form of radiant energy and that the respective portions of convection heat and of radiant heat, which are emitted by the at least one burner 5, are specifically adjusted via the adjustment of the brightness of the flame of the at least one burner 5.

In the first melting phase after the loading, a large portion of the metal to be melted, lies "in the shadow" of the burner flame, which is to express that this portion of the material can be barely heated by heat radiation, because it is shaded by material, which is located between the flame and this portion of the material. A large portion of convection heat makes it possible for the large hot gas quantities required for this to also permeate the areas between the solid material and to heat them.

At least one of the burners 5, in this example both burners 5, are operated during the second melting phase (c) such that a larger portion of the burner capacity is emitted in the form of radiant energy than in the form of convection. The second melting phase (c) starts when a melting bath surface has formed. This example is a hearth furnace comprising a device (not shown) for circulating the melting bath 6. In this case, a large portion of radiant capacity of the capacity, which is emitted by each of the two burners 5 illustrated herein, is desired according to the invention. According to experience, a high radiant capacity of the burner 5 corresponds to a very bright flame of the burner 5. According to the invention, the brightness of the flame is used to evaluate and adjust the radiant capacity of a flame.

In this example, the flame is thus also adjusted in a particularly advantageous manner to be different from one another for the first melting phase (b) and for the second melting phase (c) with reference to its brightness.

What is claimed is:

1. A method for operating a hearth furnace for melting a metal-containing material, wherein the hearth furnace encompasses a furnace chamber heated by means of at least one burner, and a loading chamber with a pumping device disposed upstream of and in communication with the furnace chamber, the at least one burner positioned to provide heat to the loading chamber, the method comprising:
   a) introducing the metal-containing material into the hearth furnace,
   b) melting the metal-containing material in a first melting phase until a melting bath surface has formed,
   c) melting the metal-containing material in a second melting phase after the melting bath surface has formed,
   d) removing and/or holding the melted metal,
   e) operating the at least one burner during the first melting phase (b) such that a larger portion of burner capacity is emitted as convection energy rather than as radiant energy, and adjusting respective portions of convection heat and of radiant heat emitted by the at least one burner via adjustment of at least one of brightness, size and length of a flame from the at least one burner.

2. The method according to claim 1, further comprising heating the loading chamber with the at least one burner.

3. The method according to claim 1, wherein operating the at least one burner is with an oxidant comprising air.

4. The method according to claim 1, wherein operating the at least one burner during the second melting phase (c) is such that a larger portion of the burner capacity is emitted as the radiant energy than as the convection energy.

5. The method according to claim 4, comprising adjusting flames of the at least one burner to be different from one another for the first melting phase (b) and for the second melting phase (c) with reference to at least one of brightness, length and volume of the flames.

6. The method according to claim 1, wherein operating the at least one burner is with a gas selected from the group consisting of an oxygen-containing gas having an oxygen content greater than that of air, and a technically pure oxygen.

7. The method according to claim 1, comprising circulating a portion of furnace gas in the furnace chamber to increase convection therein.

8. The method according to claim 1, comprising regulating at least one of the brightness and the size of the flame by the at least one burner as a function of a temperature of the melted metal.

9. The method according to claim 1, comprising measuring the brightness of the flame with an ultraviolet (UV) probe.

10. The method according to claim 1, further comprising collecting and evaluating operating parameters of the at least one burner electronically.

11. The method according to claim 10, wherein the melting is fully automated, and the electronically collected operating parameters are accessed as input variables.

\* \* \* \* \*